Patented Aug. 27, 1946

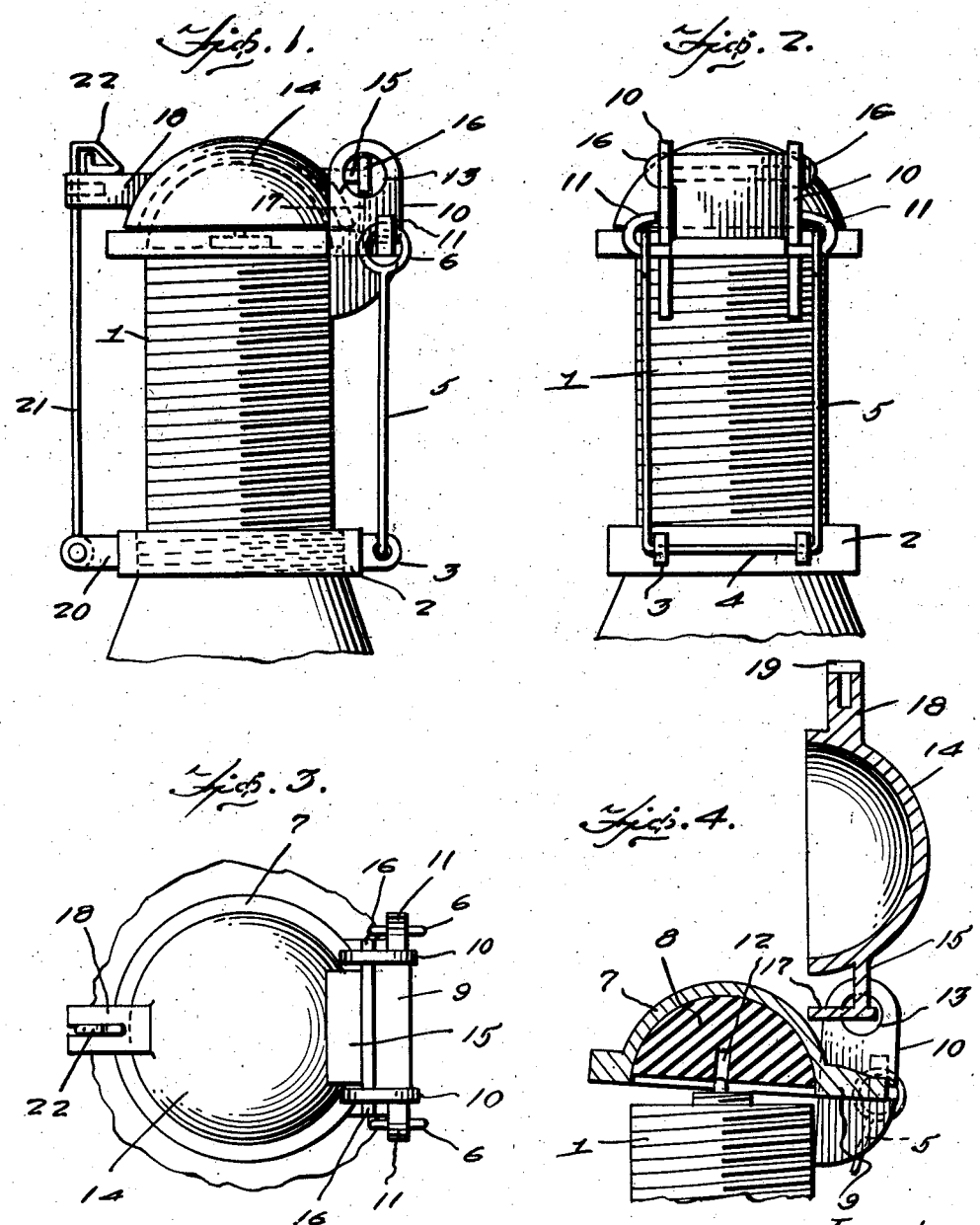

2,406,563

UNITED STATES PATENT OFFICE 2,406,563

VALVE CAP

Wesley J. Roberts, North Little Rock, Ark.

Application June 8, 1945, Serial No. 598,374

3 Claims. (Cl. 138—89.3)

This invention relates to valve caps for pneumatic tires, and more particularly, to a valve cap which is fastened to the valve stem of a tire to prevent its loss but which may be manipulated to expose the valve without detaching it from said stem.

A main object of the invention is to provide a novel and improved valve cap which affords thorough protection for the valve stem against leakage of air through the valve and which prevents the admission of dirt or other undesirable foreign matter.

A further object of the invention is to provide an improved valve cap which is securely fastened to the valve stem to prevent its loss but which may be readily manipulated from an open to a closed position or from a closed to an open position.

Further objects and advantages of the invention will appear from the following description and claims, and from the accompanying drawing, wherein:

Figure 1 is a side elevational view of a valve stem equipped with a valve cap according to this invention.

Figure 2 is an end elevational view of the structure of Figure 1.

Figure 3 is a top view of the structure of Figure 1.

Figure 4 is a detail view in cross-section showing the cap structure in released and partly open position.

Referring to the drawing, 1 designates the conventional valve stem of a pneumatic tire. Threadedly engaged with valve stem 1 is a collar member 2 which serves as the anchoring means for the valve cap structure. Formed on one side of collar member 2 are a pair of eye lugs 3, 3 in which is pivotally engaged the lower straight portion 4 of a U-shaped bail member 5, preferably fabricated of stiff wire. The upper ends of the legs of bail member 5 are formed with eye portions 6. Pivotally secured to bail member 5 at eye portions 6 is a sealing cap member 7 comprising a rigid shell of metal, plastic, or other suitable material containing a deformable gasket element 8 of rubber or the like. Cap member 7 is formed with an extension 9 which carries rigidly secured thereto a pair of vertical parallel lug members 10, 10. Formed on the outwardly facing surfaces of said lug members adjacent their lower ends are curved ear members 11, 11 which are respectively engaged with the eye portions 6 to pivotally secure cap member 7 to bail member 5.

The gasket element 8 is formed with a central recess 12 to provide clearance for the upwardly protruding end of the valve when the cap is in clamped position on the valve stem.

Lug members 10, 10 are formed with circular openings 13, 13 adjacent their upper ends. Pivotally secured to lug members 10, 10 at said circular openings is a clamping cap member 14 comprising a shell element adapted to closely fit over sealing cap member 7. Clamping cap member 14 is provided with a rear extension 15 formed with a pair of oppositely directed lug elements 16, 16 adapted to be pivotally engaged in the respective circular openings 13, 13 and also formed with a depending arm member 17 adapted to contact the upper surface of extension 9 when clamping cap member 14 is rotated into overlying relation with sealing cap 7 and to exert a substantial pressure on said upper surface.

Clamping cap member 14 is provided with a front extension 18 formed with a notch or slot 19. Collar member 2 is formed with an eye lug 20 at its front portion in which is pivotally secured a clamping bar 21, preferably formed of stiff wire, the upper end of said clamping bar being shaped to form a resilient hook portion 22 which is adapted to be engaged through slot 19 and exert a clamping force on the top surface of extension 18 to secure the clamping cap member 14 firmly in position over sealing cap 7. The clamping force exerted by hook portion 22 combines with the clamping pressure exerted by depending arm member 17 on the upper surface of extension 9 to provide a balanced clamping action on sealing cap 7.

Extension 18 is appropriately shaped and formed so that it may be employed as a wrench for removing or replacing the valve core.

To open the cap, clamping bar 21 is disengaged from extension 18 and clamping cap 14 is raised to the position shown in Figure 4. Sealing cap 7 may then be lifted off the valve cap so that access may be had to the valve. The reverse procedure is followed in closing the cap.

Collar member 2 is initially engaged sufficiently far down on the valve stem so that the desired initial sealing pressure is obtained.

While a specific embodiment of a valve cap device has been disclosed in the foregoing description, it will be understood that various modifications within the spirit of the invention may occur to those skilled in the art. Therefore it is intended that no limitations be placed on the invention other than as defined by the scope of the appended claims.

What is claimed is:

1. A valve cap comprising an anchor member adapted to be secured to a valve stem, a sealing cap member pivotally secured to said anchor member and adapted to overlie the top of the valve stem in sealing relation thereto, a clamping element pivotally secured to said sealing cap member and adapted to overlie said sealing cap member and means securing said clamping element to said anchor member in clamping relation to said sealing cap member.

2. A valve cap comprising a collar member adapted to be threadedly engaged with a valve stem, a sealing cap member adapted to overlie the top of the valve stem in sealing relation thereto, a link connecting said sealing cap to said collar member, a clamping element pivotally secured to said sealing cap member and adapted to closely overlie said sealing cap member, and means securing said clamping element to said collar member in clamping relation to said sealing cap member.

3. The structure of claim 2, and wherein said clamping element is provided adjacent its point of pivotal securement with said sealing cap member with a pressure arm adapted to exert a sealing force on said sealing cap member.

WESLEY J. ROBERTS.